US012671939B2

(12) United States Patent
Chng et al.

(10) Patent No.: US 12,671,939 B2
(45) Date of Patent: Jun. 30, 2026

(54) SYSTEM AND METHOD FOR ADAPTIVE BEAMFORMING FOR BOOMLESS HEADPHONES WITH FIXED POSITION MICROPHONES

(71) Applicant: Dell Products LP, Round Rock, TX (US)

(72) Inventors: Eng Kang Chng, Singapore (SG); You-Yu Lin, Sanchong Dist. (TW); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 295 days.

(21) Appl. No.: 18/608,247

(22) Filed: Mar. 18, 2024

(65) Prior Publication Data

US 2025/0294288 A1 Sep. 18, 2025

(51) Int. Cl.

*H04R 3/00* (2006.01)
*G10L 25/78* (2013.01)
*H04R 1/10* (2026.01)
*H04R 1/40* (2006.01)

(Continued)

(52) U.S. Cl.

CPC .............. *H04R 3/005* (2013.01); *G10L 25/78* (2013.01); *H04R 1/1041* (2013.01); *H04R 1/1075* (2013.01); *H04R 1/406* (2013.01); *H04R 17/02* (2013.01); *H04R 29/005* (2013.01); *H04R 1/1008* (2013.01); *H04R 1/1016* (2013.01); *H04R 2201/107* (2013.01)

(58) Field of Classification Search

CPC .... H04R 3/005; H04R 29/005; H04R 1/1008; H04R 1/1016; H04R 1/1041; H04R 1/1075; H04R 1/406; H04R 17/02; H04R 2201/107; H04R 2201/401; H04R 2430/20; G10L 21/0208; G10L 25/78; G10L 2021/02166

USPC ............................................................ 381/56

See application file for complete search history.

(56) References Cited

U.S. PATENT DOCUMENTS 9,516,442 B1 12/2016 Dusan
9,532,131 B2 12/2016 Dusan
10,142,745 B2 11/2018 Petersen (Continued)

FOREIGN PATENT DOCUMENTS

WO 2020/252972 A1 12/2020
WO 2022/231977 A1 11/2022

*Primary Examiner* — Paul Kim

(74) *Attorney, Agent, or Firm* — Prol Intellectual Property Law, PLLC; H. Kenneth Prol

(57) ABSTRACT

A set of headphones comprising a digital signal processor, a headphone power management unit (PMU) to provide power to the digital signal microprocessor (DSP), a voice pick-up sensor to detect vibrations at a user's head caused by the user talking, and the DSP to determine where the user's voice audio input is picked up via an array of microphones formed into the set of headphones and wherein, when the DSP does not detect the user's voice audio input at the array of microphones, the DSP executes computer-readable program code of a beamforming module to recalibrate an angle of a voice detection zone at which the array of microphones detect the user's voice. The DSP to further calibrate the beamforming angle of the voice detection zone once the user's voice audio input is detected to meet an amplitude threshold level or a signal to noise level threshold level.

20 Claims, 5 Drawing Sheets

(51) Int. Cl.
*H04R 17/02* (2006.01)
*H04R 29/00* (2006.01)

(56) References Cited

U.S. PATENT DOCUMENTS

| | | | | |
|---|---|---|---|---|
| 10,356,536 | B2 | 7/2019 | Petersen | |
| 2014/0093091 | A1 | 4/2014 | Dusan | |
| 2014/0093093 | A1 * | 4/2014 | Dusan .................... | H04R 3/005 381/74 |
| 2014/0270231 | A1 | 9/2014 | Dusan | |
| 2015/0245129 | A1 | 8/2015 | Dusan | |
| 2018/0146307 | A1 | 5/2018 | Petersen | |
| 2023/0197050 | A1 | 6/2023 | Bulow | |
| 2023/0215453 | A1 | 7/2023 | Baek | |
| 2024/0020490 | A1 | 1/2024 | Shin | |

* cited by examiner

SYSTEM AND METHOD FOR ADAPTIVE BEAMFORMING FOR BOOMLESS HEADPHONES WITH FIXED POSITION MICROPHONES

FIELD OF THE DISCLOSURE

The present disclosure generally relates to beamforming for microphones with boomless headphones. More specifically, the present specification describes a system and method for adaptive beamforming angle for improved user voice pick up by fixed microphones on a headset or earbuds.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more of these applications such as work productivity applications, teleconference applications, or gaming applications. Further, the information handling system may be operatively coupled to headphones that may include a headset or earbud type earphones that provide audio output to a user via one or more speakers as well as allow a user to provide audio input via microphones to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
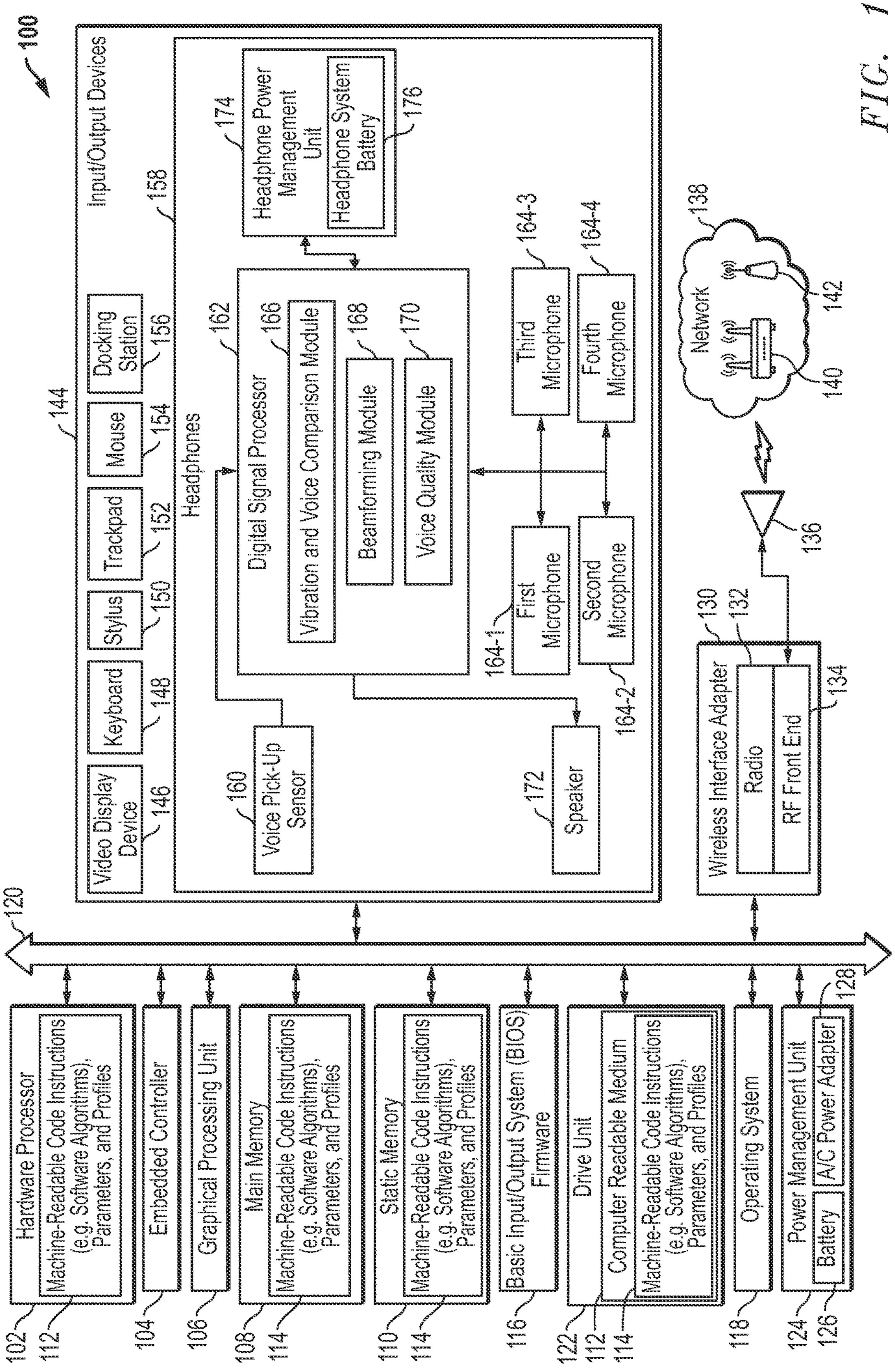
FIG. 1 is a block diagram illustrating an information handling system including a set of headphones that includes a voice pick-up sensor, a plurality of microphones, and computer-readable program code instructions of a beamforming module used to alter the angle at which the user's voice is detected by the plurality of microphones based on different orientations of the microphones fixed in the headphones relative to the user's mouth according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems include a plurality of input and output devices that allow a user to interact with the information handling system. The types of input may include cursor movement and selection input from a mouse and/or trackpad, keystroke input from a keyboard, audio input from a microphone, and audio output at a speaker or other speaker driver. The microphone and speaker, for example, may be formed into a single device such as a headset, headphones, earphones, earbuds, and the like, generally referred to as headphones herein, that allows a user to engage in a discussion with another user remote from the information handling system during a videoconferencing session or an online gaming session by the user providing audio input to a microphone on the headphones and receiving audio output from the speaker or other speaker driver.

The user may simply wear the headset or earphones by aligning the speakers with the user's ears. A voice detection zone is formed from a plurality of boomless, fixed microphones on the headphones to focus recording a user's voice at the mouth area via microphone beamforming and to deemphasize or reduce picking up voices or sounds in the background of a user wearing the headphones. However, this placement of the earpieces of the headset or speakers of the individual earphones over or into the user's ears may misalign the fixed microphones formed into the headset or earphones with detecting voice input from the user's mouth, especially where the fixed microphones are not mounted on a boom that extends near the user's mouth. This misalignment of the microphones with detecting voice input from the user's mouth creates a voice detection zone where the user's voice is not detectable or has poor voice detection. The user must, instead, wear the headset or earpiece in a certain orientation in order for the user's voice to be picked up by the fixed microphones. The user is unable to see such a voice detection zone or may be unaware of the voice detection zone and cannot adjust wearing orientation or may simply prefer to wear the headset differently for comfort reasons or other reasons. This may lead to a situation where, in order to be heard well from the boomless, fixed microphones by another user, the user of the headset or earphones must either know how to properly align the headset, earphones, earbuds, or other type headphones and, in some situations, wear the headset, earphones, or earbuds in an uncomfortable or undesirable orientation.

The present specification describes a headphone set such as a headset, earphones, or earbuds comprising a digital signal processor (DSP) and a headphone power management unit (PMU) to provide power to the DSP. The headphones further include a voice pick-up sensor to detect the occurrence of vibrations at a user's face or head caused by the user talking. In an embodiment, the voice pick-up sensor includes a piezoelectric layer that receives the vibrations at the user's face and head to detect when the user is talking or emitting other voice sounds. In an embodiment, the DSP of the headphones also determines when and if the user's voice sound is picked up as voice audio input via an array of two or more fixed microphones that are boomless and formed into the headphones, such as in a fixed position on the body or cases of the headphones. This array of microphones may be specifically oriented in fixed positions within the housing of the headphones such that a voice detection zone is created within which the user's voice may be detected and the pickup of background sounds is reduced or minimized. It is understood that boomless microphones refer to microphones fixed to a housing of the headphones with little or no boom that would otherwise placing those microphones near to a user's mouth. As described herein, where the user wears the headphones in a position that is not optimal to detect the user's voice within the created voice detection zone, the DSP executes computer-readable program code of a beamforming module to recalibrate the angle at which the array of microphones detect the user's voice. This, thereby, allows the headphones to adjust the voice detection zone based on whether the DSP detects the user's voices at the array of microphones at a threshold amplitude decibel (dB) level or signal-to-noise-ratio (SNR). In some cases, the voice detection zone may not pick up any voice audio input at all although the user is talking. In other embodiments, voice audio input may be recorded at the voice detection zone but it may be insufficient in amplitude or in a ratio to background sounds being recorded as well. In an embodiment, the beamforming module recalibration includes shifting a beamforming angle of the voice detection zone left or right, increasing or decreasing the beamforming angle of the voice detection zone up or down, widening the beamforming for the voice detection zone or stopping beamforming to receive audio signals from all directions away from the headphone as various recalibration options to record the user's voice sounds sufficiently. In an embodiment, this may be controlled by filtering and controlling gain of the audio signals at each of the microphones within the microphone array and combining the outputs to extract, via operation of the DSP, the desired signal level from a voice detection zone at a user's mouth and rejecting other signals such as interfering signals from background noise according to the spatial location of the detected audio signals.

In an embodiment, the DSP may execute computer-readable program code of a vibration and voice comparison module to compare the occurrence of the vibrations detected by the voice pick-up sensor with an occurrence of the user's voice picked up as voice audio input at the array of microphones. This may be done so that the DSP may know whether the created voice detection zone has been defined as is even able to pick up voice sounds or the voice detection zone is completely misaligned when a user is confirmed to be speaking by the occurrence of vibrations detected by the voice pick-up sensor. In another embodiment, the DSP may execute computer-readable program code of a vibration and voice comparison module to compare, not only the occurrence but also the magnitude of the vibrations detected by the voice pick-up sensor with an amplitude or frequency of the user's voice picked up at the array of microphones. This may be done so that the DSP may know whether the created voice detection zone has been defined appropriately to record the user's voice but also operates to determine if the voice audio input recorded meets a threshold level of received voice input amplitude or SNR relative to background sounds. Thus, a mismatch between the occurrence and/or magnitude of the vibrations detected by the voice pick-up sensor and the frequency or amplitude of the user's voice picked up at the array of microphones indicates to the DSP that external noises are being picked up by the array of microphones at a level that needs adjustment and thus the voice detection zone may need adjustment. Similarly, a match between the occurrence and/or magnitude of the vibrations detected by the voice pick-up sensor and the frequency, amplitude, or SNR of the user's voice picked up at the array of microphones meeting a threshold level when speaking vibrations are detected indicates to the DSP that the user's voice is being sufficiently picked up by the array of microphones and no beamforming adjustments to the voice detection zone are needed.

In an embodiment, the DSP may execute computer-readable program code of a voice quality module to determine whether the detected user's voice has a sufficient amplitude, frequency, or SNR level for audio input and wherein the DSP determines whether a threshold amplitude, threshold frequency, or threshold SNR relative to background noise has been reached to determine whether the sufficient amplitude, sufficient frequency, or sufficient SNR for audio input at the array of microphones has been met.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports or wireless interface adapter 130 for communicating with external devices, as well as various input and output (I/O) devices 144, such as a docking station 156, a mouse 154, a trackpad 152, a stylus 150, a keyboard 148, a video/graphics display device 146, headphones 158 of a variety of types such as headsets, earphones, earbuds, or the like according to embodiments herein, or any combination thereof. Portions of an information handling system 100 may themselves be considered information handling systems 100.

Information handling system 100 may include devices or modules that embody one or more of the devices or execute computer-readable program code instructions for one or more systems and modules. The information handling system 100 may execute code instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100. Headphones 158 may include a digital signal microprocessor or other hardware processing resource to execute software or firmware code insurrection of modules or systems of embodiments herein.

The information handling system 100 may include the hardware processor 102 such as a central processing unit (CPU). Any of the processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such as a headphones 158 according to several embodiments described herein, a keyboard 148, a mouse 154, video display device 146, stylus 150, or trackpad 152 among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a peripheral device 144 such as a headphones 158 or other smart peripheral device having a hardware processing device such as a hardware processor, microcontroller, or other hardware processing resource and which may be further operatively coupled to one or more additional peripheral devices 144. Various drivers and hardware control device electronics may be operatively coupled to operate the I/O devices 144 according to the embodiments described herein. The present specification contemplates that the I/O devices 144 may be wired or wireless.

A network interface device of the information handling system 100 shown as wireless interface adapter 130 can provide connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices via, for example, a Bluetooth® or Bluetooth® Low Energy (BLE) protocols. In an embodiment, the WAN, WWAN, LAN, and WLAN may each include an AP 140 or base station 142 used to operatively couple the information handling system 100 to a network 138. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna radio frequency (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, the headphones 158, the speaker 172, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be operatively coupled to a headphones 158 of a variety of types including a headset, earphones, earbuds, or the like. This operative connection may include a wired or wireless connection. In the example embodiment where the headphones 158 are operatively coupled to the information handling system 100 via a wired connection, the headphones 158 may include a universal serial bus (USB) connection that may be inserted into a USB port of the information handling system 100 or a microphone/speaker jack connection to a microphone/speaker port. In the example embodiment where the headphones 158 are operatively coupled to the information handling system 100 via a wireless connection, the headphones 158 may include a radio or other wireless network interface device that allows the headphones 158 to communicate with the wireless interface adapter 130 of the information handling system 100.

The headphones 158 may include any type of audio input/output device that detects the user's voice at one or more fixed microphones 164-1, 164-2, 164-3, 164-4 and provides audio output to the user via one or more speakers 172. In an example embodiment, the headphones 158 may be a headset that includes a headband, earpieces to be placed over the user's ears, and a plurality of fixed microphones 164-1, 164-2, 164-3, 164-4 formed within the headset. In another example embodiment, the headphones 158 may include earphones or earbuds that include a set of earpieces that communicate with each other via a radio or other network interface device or are wired and also includes a plurality of fixed microphones 164-1, 164-2, 164-3, 164-4 to capture the user's voice and one or more speakers 172 to provide output to the user. The plurality of fixed microphones 164-1, 164-2, 164-3, 164-4 are boomless in that they are not disposed on a boom moveable in front of a user's mouth, but rather are incorporated into one or more housing of the headphones 158 at varying locations in embodiments herein.

The headphones 158 include any voice pick-up sensor 160 that detects vibrations created by the user's voice when the user is talking. For purposes of the present specification, the voice pick-up sensor 160 may be any type of device that detects vibrations at the headphones 158 as described herein. The voice pick-up sensor 160 may capture the user's voice pattern by detecting vibrations of the bones in the user's face or head or other vibration due to a user talking. As the user talks, the vibration of the user's vocal cords may create this vibration throughout various bones or other tissues in the user's head including the jawbone, the skull, or cartilage of the cars. In an embodiment, the voice pick-up sensor 160 may include a piezoelectric layer that receives the vibrations at the user's face or head when the user is talking. Movement of the piezoelectric layer creates an electrical signal that is detectable by the voice pick-up sensor 160 and passed onto the digital signal processor (DSP) 162 as described herein. In an example embodiment, the voice pick-up sensor 160 may be a Voice Pick Up Bone Sensor (VPU) by Sonion®, a VA1200 Bone Conductor Sensor by Vesper®, and the like that includes any voice pick-up sensor as described herein.

In an embodiment, the headphones 158 may also include a plurality of fixed microphones 164-1, 164-2, 164-3, 164-4. These fixed microphones 164-1, 164-2, 164-3, 164-4 may form an array of fixed microphones 164-1, 164-2, 164-3, 164-4 that each detect, independently, the user's voice as well as other surrounding sounds. In an embodiment, a first fixed microphone 164-1, a second fixed microphone 164-2, a third fixed microphone 164-3, and a fixed fourth microphone 164-4 may be formed into a housing of the headphones 158 at specific locations thereby forming an array of fixed microphones 164-1, 164-2, 164-3, 164-4 such that the user's voice and surrounding sounds can be detected. Any plurality of fixed microphones are contemplated for use with the headphones 158 in carious embodiments herein.

During operation, the headphones 158 may be initiated by the user by, for example, activating a switch or by other triggers. For example, triggers may include inserting the USB or other plug into a USB or other port of the information handling system 100 or by motion sensing, touch sensing, removal from a charging case or stand, or other another type of trigger or switch. This initiation of the headphones 158 causes a headphone PMU 174 to provide power from the headphone system battery 176 to the DSP 162. Additionally, the headphone system battery 176 may provide power the voice pick-up sensor 160 described herein such that the voice pick-up sensor 160 may continuously detect when the user is talking by detecting the occurrence and/or magnitude of vibrations from the user's head or face and provide an indication of talking vibrations to the DSP 162. In an embodiment, the DSP 162 may also receive audio input as detected by any plurality of the fixed microphones 164-1, 164-2, 164-3, 164-4 within the fixed microphone array that are boomless and fixed in the housings of the headphones 158. This audio input may be used to determine whether the user's voice is sufficiently detected by the microphones 164-1, 164-2, 164-3, 164-4. If the user's voice is detected at the voice pick-up sensor 160, the DSP 162 may compare the input from when the voice pick-up sensor 160 detects talking with the detected voice from the microphones 164-1, 164-2, 164-3, 164-4. In an embodiment, the DSP 162 may execute computer-readable program code of a vibration and voice comparison module 166 to compare the occurrence and/or magnitude of the vibrations detected as talking by the voice pick-up sensor 160 with a frequency, amplitude, or SNR level of the user's voice picked up at the array of microphones 164-1, 164-2, 164-3, 164-4. Where no match is found in the levels such that the user's voice fails to meet a threshold level of frequency, amplitude, or SNR level, the process may continue with the DSP 162 detecting voice activity at the voice pick-up sensor 160 and engage in re-calibration beamforming for the array of microphones 164-1, 164-2, 164-3, 164-4 as described herein. However, where a match is found in the levels such that a threshold frequency, amplitude, or SNR level has been met, the DSP 162 may execute computer-readable program code of a voice quality module 170 to determine whether the detected user's voice has a sufficient amplitude and frequency for audio input. In an embodiment, the DSP 162 may determine whether a threshold amplitude, threshold frequency, or threshold SNR level has been reached to determine whether the sufficient frequency, sufficient amplitude, or sufficient SNR level for audio input at the array of microphones 164-1, 164-2, 164-3, 164-4 is met.

In an embodiment where the array of microphones 164-1, 164-2, 164-3, 164-4 does not pick up the user's voice audio input, the voice audio input is eclipsed or too low relative to background sounds (as an SNR level), the signals from the voice pick-up sensor 160 does not match the user's voice audio input occurrence or magnitudes mismatch, and/or the user's voice quality does not reach the threshold amplitude, or SNR level, the DSP 162 may execute the computer-readable program code of the beamforming module 168 to recalibrate a voice detection zone. The beamforming module 168 may engage in beamforming module recalibration processes that, in an embodiment, may include shifting a beamforming angle of a voice detection zone left or right, increasing or decreasing the beamforming angle of the voice detection zone up or down, widening the voice detection zone, and/or stopping beamforming and receiving audio signals from all directions away from the headphone. This beamforming module recalibration process may allow the headphones 158 to alter the voice detection zone that the array of microphones 164-1, 164-2, 164-3, 164-4 detect the user's voice sounds at a more focused area by the user's mouth while filtering or minimizing surrounding sounds coming from outside the voice detection zone.

As described herein, the user may wear the headphones 158 (e.g., a headset, earphones, or earbuds) in a position that is most comfortable for the user. This optimal comfort position of the headphones 158 may result in the headphones 158 being placed such that the voice detection zone detectable with the boomless, fixed microphones 164-1, 164-2, 164-3, 164-4 is not aligned with the user's mouth. As such, the user's voice may not be capable of properly detecting the user's voice relative to background sounds when using the headphones 158. During operation of the headphones 158, therefore, the DSP 162 may recalibrate the beamforming of the microphones 164-1, 164-2, 164-3, 164-4 by executing computer-readable program code of the beamforming module 168 to adjust the direction and voice detection zone that the plurality of microphones 164-1, 164-2, 164-3, 164-4 pick up the user's voice. Thus, the voice pick-up sensor 160 and execution of computer-readable program code instructions of a vibration and voice comparison module 166 by the DSP 162 may be used to determine the voice detection zone is not optimally established using the microphones 164-1, 164-2, 164-3, 164-4. Execution of the computer-readable program code instructions of the beamforming module 168 may then select the optimal voice detection zone by engaging in a beamforming process when the user is detected to be talking described herein. This allows the user to wear the headphones 158 in a position that is most comfortable without compromising the ability of the boomless fixed microphones 164-1, 164-2, 164-3, 164-4 of the headphones 158 to pick up the user's voice. Also, by adaptively beamforming to detect the optimal voice detection zone for the boomless, fixed microphones 164-1, 164-2, 164-3, 164-4 to pick up the user's voice, other noises and voices that are not within the optimal voice detection zone are rejected from the audio input by the DSP 162.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2B:
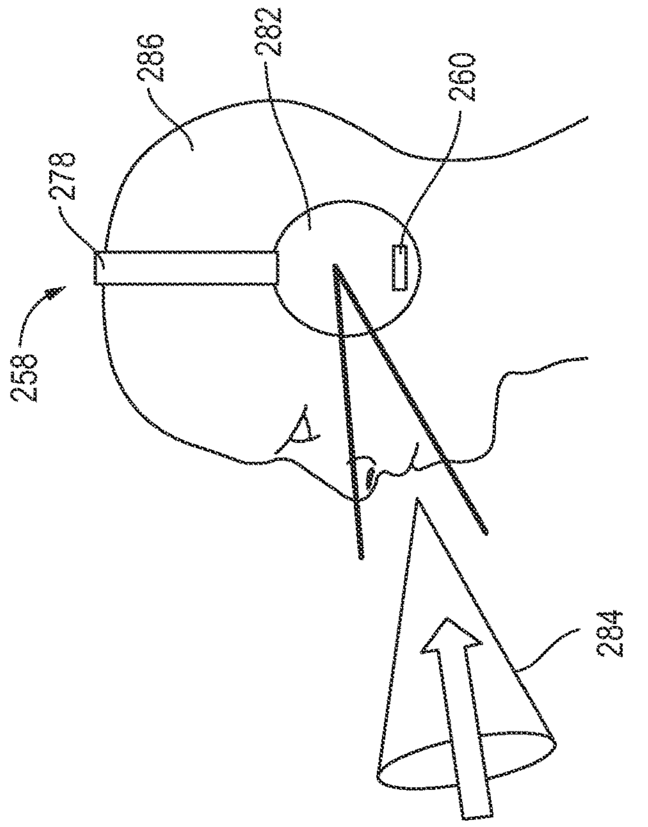
FIG. 2B is a graphical diagram of a user wearing the headset of FIG. 2A and showing a voice detection zone at which user's voice is detected by a plurality of fixed microphones according to an embodiment of the present disclosure.
Figure 2A:
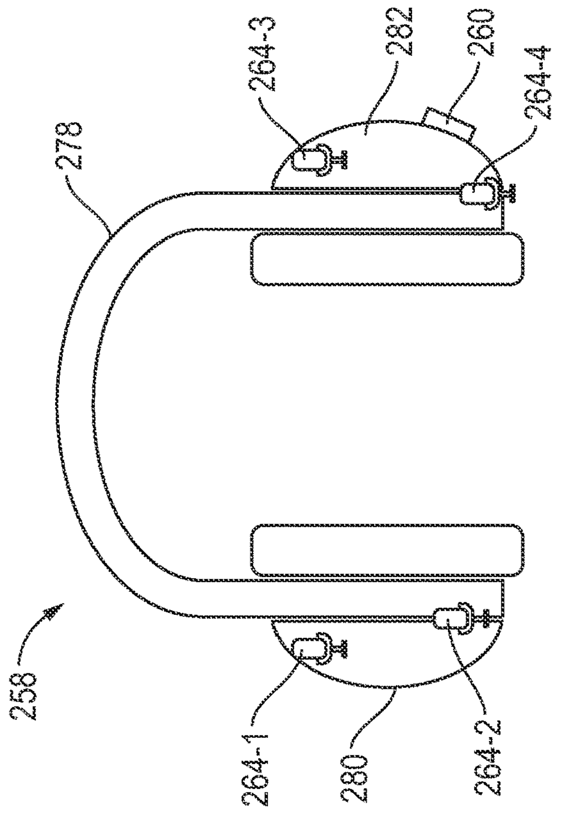
FIG. 2A is a graphical diagram depicting a headset that includes a voice pick-up sensor and an array of fixed microphones used to detect the user's voice according to an embodiment of the present disclosure.

FIG. 2A is a graphical diagram depicting a headphone in the form of a headset 258 that includes a voice pick-up sensor 260, an array of fixed microphones 264-1, 264-2, 264-3, 264-4 used to detect the user's voice, and one or more speakers (not shown) in earpieces 280, 282 according to an embodiment of the present disclosure. Additionally, FIG. 2B is a graphical diagram of a user 286 wearing the headset of FIG. 2A and showing a voice detection zone 284 at which user's voice is picked up by a plurality of fixed microphones 264-1, 264-2, 264-3, 264-4 according to an embodiment of the present disclosure.

As described herein, the headphone as described in connection with FIG. 1 may be in the form of a headset 258. The headset 258 depicted in FIGS. 2A and 2B may include a headband 278 operatively coupled to one end of the headband 278 to a first earpiece 280 and at a second end of the headband 278 to a second earpiece 282. In an embodiment, the first earpiece 280 and second earpiece 282 may be over-the-car earpieces 280, 282 that rest onto the surface of the user's 286 ears. In another embodiment, the first earpiece 280 and second earpiece 282 may be formed into cups that encase the user's 286 ears and rest on the user's 286 head (including bone and other tissues) around the user's 286 ear. In the embodiments herein, the first earpiece 280 and second earpiece 282 may include one or more speakers or other audio drivers that provide audio output to a user.

In an embodiment, each of the first earpiece 280 and second earpiece 282 may include one or more microphones 264-1, 264-2, 264-3, 264-4. Any plurality of microphones are contemplated in embodiments herein; however, three to four microphones provide for a plurality of audio recording input location points for beamforming to establish or adjust a voice detection zone 284. In the embodiment shown in FIG. 2A, for example, the first earpiece 280 includes a first microphone 264-1 and a second microphone 264-2 formed into the housing of the first earpiece 280. The second earpiece 282, in the embodiment shown in FIG. 2A, includes a third microphone 264-3 and a fourth microphone 264-4. In an embodiment, the first microphone 264-1, second microphone 264-2, third microphone 264-3, and fourth microphone 264-4 may be used to detect a user's 286 voice within a voice detection zone 284 as shown in FIG. 2B. This voice detection zone 284 may be formed via the DSP (formed within the housing of either the first earpiece 280 or second earpiece 282) executing computer-readable code of the beamforming module (e.g., FIG. 1, 168) and may have a vertical and horizontal area determined such that other sounds outside of the voice detection zone 284 are filtered out or limited and the user's 286 voice is detected as enhanced relative to background sounds as the user talks. In example embodiments, the voice detection zone 284 may be a cone, a pyramidal shape, or any other beamformed area.

Again, the headset 258 may include any voice pick-up sensor 260 that detects the occurrence and/or magnitude of vibrations created by the user's 286 voice when the user 286 is talking. For purposes of the present specification, the voice pick-up sensor 260 may be any type of device that detects vibrations at the headphones 258 as described herein. The voice pick-up sensor 260 may capture the user's 286 voice pattern by detecting vibrations of the bones or other tissues in the user's face or head. As the user talks, the vibration of the user's vocal cords may create this vibration throughout various bones and tissues in the user's 286 head including the jawbone, the skull, or the ear cartilage. In an embodiment, the voice pick-up sensor 260 may include a piezoelectric layer that receives the vibrations at the user's face when the user is talking. Movement of the piezoelectric layer creates an electrical signal that is detectable by the voice pick-up sensor 260 and passed onto the DSP (not shown) as described herein. In an example embodiment, the voice pick-up sensor 260 may be a Voice Pick Up Bone Sensor (VPU) by Sonion®, a VA1200 Bone Conductor Sensor by Vesper®, and the like that includes any voice pick-up sensor 260 as described herein.

In an embodiment, the microphones 264-1, 264-2, 264-3, 264-4 may form an array of microphones 264-1, 264-2, 264-3, 264-4 that each detect, independently, the user's voice as well as other surrounding sounds. During operation, the headset 258 may be initiated by the user by, for example, activating a switch, inserting the USB plug into a USB port of the information handling system, motions sensor, touch sensor, or any other switch or trigger. This initiation of the headset 258 causes a headset PMU (not shown) to provide power from the headphone system battery (not shown) to the DSP. Additionally, the headphone system battery may provide power to the voice pick-up sensor 260 described herein such that the voice pick-up sensor 260 may continuously detect when the user is talking by detecting the vibrations from the user's face or head. In an embodiment, the DSP may receive audio input as detected by each of the microphones 264-1, 264-2, 264-3, 264-4 within the microphone array. This audio input may be used to determine whether the user's voice input is currently being sufficiently detected by the microphones 264-1, 264-2, 264-3, 264-4 when the user is detected to be speaking by the voice pick-up sensor 260 in embodiments herein. If the user's voice is detected, the DSP may compare the input from the voice pick-up sensor 260 with the detected voice from the microphones 264-1, 264-2, 264-3, 264-4 while the user is speaking. In an embodiment, the DSP may execute computer-readable program code of a vibration and voice comparison module to compare when the vibrations are detected or even the magnitude of the vibrations detected by the voice pick-up sensor 260 with a frequency, amplitude, or SNR level of the user's voice picked up at the array of microphones 264-1, 264-2, 264-3, 264-4. Where no match is found, the process may continue with the DSP detecting voice activity at the voice pick-up sensor 260 and engage in re-calibration beamforming as described herein. However, where a match is found, the DSP may execute computer-readable program code of a voice quality module to determine whether the detected user's voice has a sufficient frequency, sufficient amplitude, or sufficient SNR level for audio input. In an embodiment, the DSP may determine whether a threshold amplitude, threshold frequency, or threshold SNR level has been reached to determine whether the sufficient frequency, sufficient amplitude, or sufficient voice signal relative to background sounds for audio input at the array of microphones 264-1, 264-2, 264-3, 264-4 is met.

In an embodiment where the array of microphones 264-1, 264-2, 264-3, 264-4 does not pick up the user's voice or it is too low relative to background sounds, the signals from the voice pick-up sensor 260 does not match the user's voice, and/or the user's voice quality does not reach the threshold amplitude, threshold frequency, or threshold SNR level, the DSP may execute the computer-readable program code of the beamforming module. The beamforming module may engage in beamforming module recalibration processes that, in an embodiment, may include shifting a beamforming angle of a voice detection zone 284 left or right, increasing or decreasing the beamforming angle of a voice detection zone 284 up or down, widening the of voice detection zone 284, and/or stopping beamforming and receiving audio signals from all directions away from the headphone. This beamforming module recalibration process may allow the headset 258 to alter the voice detection zone 284 up, down, left, or right so that the array of microphones 264-1, 264-2, 264-3, 264-4 detects the user's voice more accurately at the user's mouth rather than in a misaligned area that may record surrounding voices and sounds instead or more prominently.

Figure 3A:
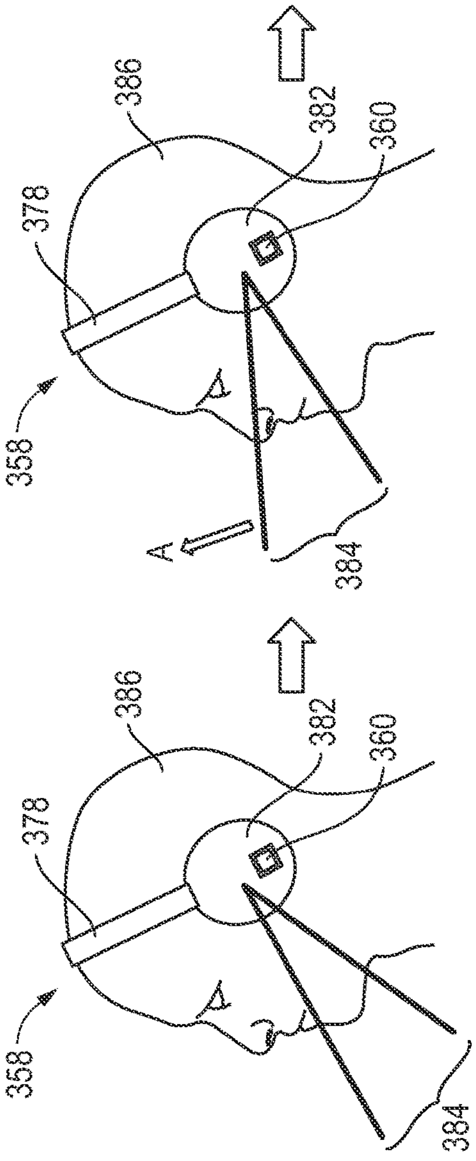
FIG. 3A is a graphical diagram depicting the voice detection zone being unaligned with the user's mouth and the adjustment of that voice detection zone via beamforming with the fixed microphones according to an embodiment of the present disclosure.
Figure 3B:
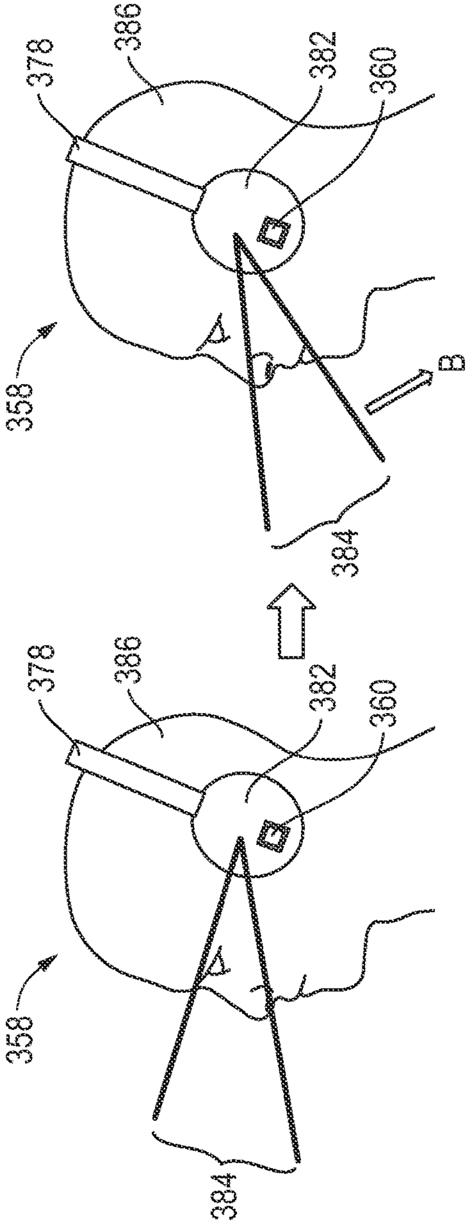
FIG. 3B is a graphical diagram depicting the voice detection zone being unaligned with the user's mouth and the adjustment of that voice detection zone via beamforming with the fixed microphones according to another embodiment of the present disclosure.

Turning to FIGS. 3A and 3B, the user may wear the headset in a position that is most comfortable to the user. This optimal comfort position of the headset may result in the headset being placed such that the voice detection zone detectable with the fixed, boomless plurality of microphones is not aligned with the user's mouth. As such, the user's voice may not be capable of properly detecting the user's voice. FIG. 3A is a graphical diagram depicting the voice detection zone 384 being unaligned with the user's mouth and the adjustment of that voice detection zone 384 pursuant to the operation of the systems and method described herein according to an embodiment of the present disclosure. Similarly, FIG. 3B is a graphical diagram depicting the voice detection zone 384 being unaligned with the user's mouth and the subsequent adjustment of that voice detection zone 384 pursuant to the operation of the systems and method described herein according to another embodiment of the present disclosure. Alternative wearing positions of the headset 358 are shown in FIGS. 3A and 3B. FIGS. 3A and 3B again depict a headset 358 that includes a first earpiece (not shown) and a second earpiece 382 operatively coupled to a headband 378. The first earpiece and second earpiece 382 may include one or more microphones (not shown) integrated into the case of the headset 358 such as at the earpieces (e.g., 382), headband 378, or other portion of headset 358 that capture audio within a formed voice detection zone 384. In FIG. 3A, the user 386 may find it comfortable to wear the headset 358 such that the headband 378 is resting in a relatively more forward position than that shown in FIG. 2B or FIG. 3B. Similarly, user 386 may choose to wear the headset 358 in FIG. 3B such that the headband 378 is resting on the user's 386 head at a relatively more rearward position than that shown in FIG. 2B and FIG. 3A. Again, the selection of how to wear the headset 358 may depend on the user's 386 comfort and, accordingly, may change from user to user. The execution of the computer-readable program code instructions of the beamforming module (e.g., FIG. 1, 168) by the DSP allows the voice detection zone 384 to be altered despite these alternative wearing configurations shown in FIGS. 3A and 3B. This recalibration may be done more accurately in connection with detect of occurrence of speaking vibrations being detected at voice pick-up sensor 360 indicating the user 386 is speaking.

During operation, the voice pick-up sensor 360 may detect the user 386 talking through the conductive vibration as described herein. In an embodiment, the voice pick-up sensor 360 may capture the user's voice pattern by detecting vibrations of the bones in the user's face or head. As the user talks, the vibration of the user's vocal cords may create this vibration throughout various bones or other tissues in the user's head including the jawbone, the skull, or car cartilage. In an embodiment, the voice pick-up sensor 360 may include a piezoelectric layer that receives the vibrations at the user's face or head when the user is talking. Movement of the piezoelectric layer creates an electrical signal that is detectable by the voice pick-up sensor 360 and passed onto the DSP (not shown) as described herein. In some embodiments, the voice pick-up sensor 360 may be operatively coupled to an interior of the earpiece 382 and/or in a first earpiece. In another embodiment, voice pick-up sensor 360 may be disposed on a headband 378. The voice pick-up sensor 360 may determine occurrences of the user speaking to confirm if user voice audio input is being received by the microphones in the voice detection zone 384 or to provide for times when beamforming recalibration should occur while the user 386 is speaking in some embodiments. In other embodiments, the voice pick-up sensor 360 may determine magnitude of vibration during occurrences of the user 386 speaking to determine what user voice audio input amplitude should be received by the microphones in the voice detection zone 384 and set amplitude or SNR voice input threshold levels to determine if beamforming recalibration should occur or whether the user voice audio input data received is of sufficient level relative to the user's speaking level to meet the requirements of communications or software applications executing on an information handling system operatively coupled to the headphones 358. Greater detected vibration magnitude should result in greater expected voice audio input levels and thresholds in an embodiment.

Once the vibrations have been detected by the voice pick-up sensor 360, the DSP may receive audio input from the microphones (not shown in FIGS. 3A and 3B). The DSP may determine whether the voice audio input picked up by the microphones includes a sufficient level of the user's 386 voice when the user is talking. In an embodiment, the DSP may execute any computer-readable program code that allows the DSP to determine if the user's 386 voice forms part of or a sufficient level of the voice audio input such as with a voice activity detection algorithm or other suitable computer-readable program code as well as voice quality module for detection of voice threshold amplitude, threshold frequency, or threshold SNR levels described in embodiments herein.

Execution of the computer-readable program code instructions of the vibration and voice comparison module concurrently with the execution of the beamforming module provides for the active adjustment of voice detection zone 384 while the user is detected and confirmed as speaking from detected vibrations. In this way, the DSP may focus in on a user's voice audio input as speaking occurs and with a relative amplitude or SNR level to match the occurrence and/or magnitude of the vibrations detected by the voice pick-up sensor 360. In this way, iterative adjustments to the gain and filtering among the array of microphones on the headphones may be conducted only while confirmed utterances are occurring from the user 386 which may expedite the beamforming process and provide real time feedback of matching and reaching voice input data amplitude or SNR threshold levels in embodiments herein.

In an embodiment where the user's voice level is not sufficiently detected in the current voice detection zone 384, the DSP may execute computer-readable program code of a beamforming module that recalibrates the beamforming angle at which the voice detection zone 384 is created such that the voice detection zone 384 is moved up (as indicated by arrow A in FIG. 3A) or down (as indicated by arrow B in FIG. 3B) until the user's 386 voice is detected at a sufficient level to meet a threshold level of amplitude or SNR. This beamforming process may include any spatial audio filtering that filters out background noise outside of the voice detection zone 384 or gain adjustments among the fixed microphones while concurrently allowing the DSP to detect the user's voice as the voice detection zone 384 is moved. In an embodiment, the beamforming process may include shifting the beamforming angle, increasing or opening up the area covered within the voice detection zone 384, and/or turning the beamforming process off in order to detect audio signal from all directions. In an embodiment, where shifting the beamforming angle does not cause the DSP to be able to detect the user's voice sufficiently, the beamforming process may then move to increasing or opening up the area covered within the voice detection zone 384. In an embodiment, where increasing the area within the voice detection zone 384 does not cause the DSP to be able to detect the user's voice to a sufficient level, the beamforming process may then move to turning the beamforming process off in order to detect audio signals from all directions. In this step-wise process, the user's voice may be detected while, as much as possible, other sounds outside of the voice detection zone 384 may be filtered out by the DSP as shifting of direction is done.

In those example embodiments where the microphone does pick up the user's voice and the DSP has determined that the user's voice has been detected sufficiently, the process may include determining whether the signals obtained from the voice pick-up sensor 360 matches the audio signals of the user's 386 voice as detected at the microphones. In an embodiment, the DSP may execute computer-readable program code of a vibration and voice comparison module to determine when the vibrations are received with the detected user audio input. Further, the vibration and voice comparison module may also compare the magnitude of the vibrations detected by the voice pick-up sensor 360 with a frequency or amplitude of the user's voice input detected at the array of microphones in some embodiments. Where no match is found, the process may continue with the DSP detecting voice activity at the voice pick-up sensor 360 and engage in re-calibration beamforming again in order to detect, at the array of microphones, a louder audio input from the user's voice. However, where a match is found, the DSP may execute computer-readable program code of a voice quality module to determine whether the detected user's voice has a sufficient frequency, sufficient amplitude, or sufficient SNR level for audio input form the user's voice at the adjusted voice detection zone 384. In an embodiment, the DSP may determine whether a threshold amplitude, threshold frequency, or threshold SNR level has been reached to determine whether the sufficient audio input at the array of microphones for a user's voice has been met. Thus, the systems and methods described herein allows the headset 358 to alter the voice detection zone 384 location, direction, elevation, and size via adjustments to the array of microphones detecting the user's voice from the user's mouth during periods of when the user is confirmed to be speaking via vibration detection by the voice pick-up sensor 360 regardless of how the user 386 wears the headset 358. Thus, the comfortability of the user while wearing the headset 358 is maximized without reducing the ability of the headset 358 and its microphones to pick up the user's voice as voice audio input.

Figure 4A:
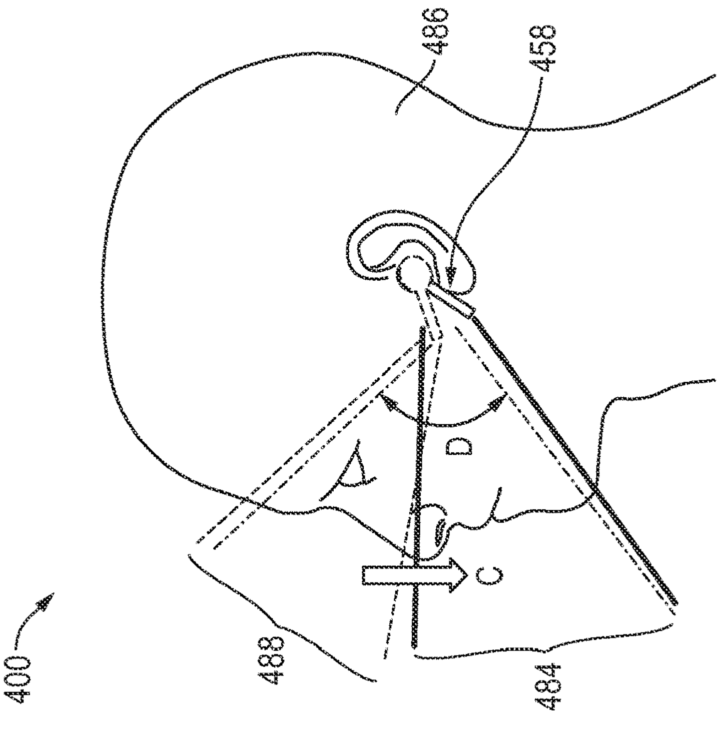
FIG. 4A is a graphical diagram depicting a user wearing earphones with the voice detection zone being aligned with the user's mouth via beamforming with the fixed microphones regardless of the placement of the earphones within the user's ears according to an embodiment of the present disclosure.
Figure 4B:
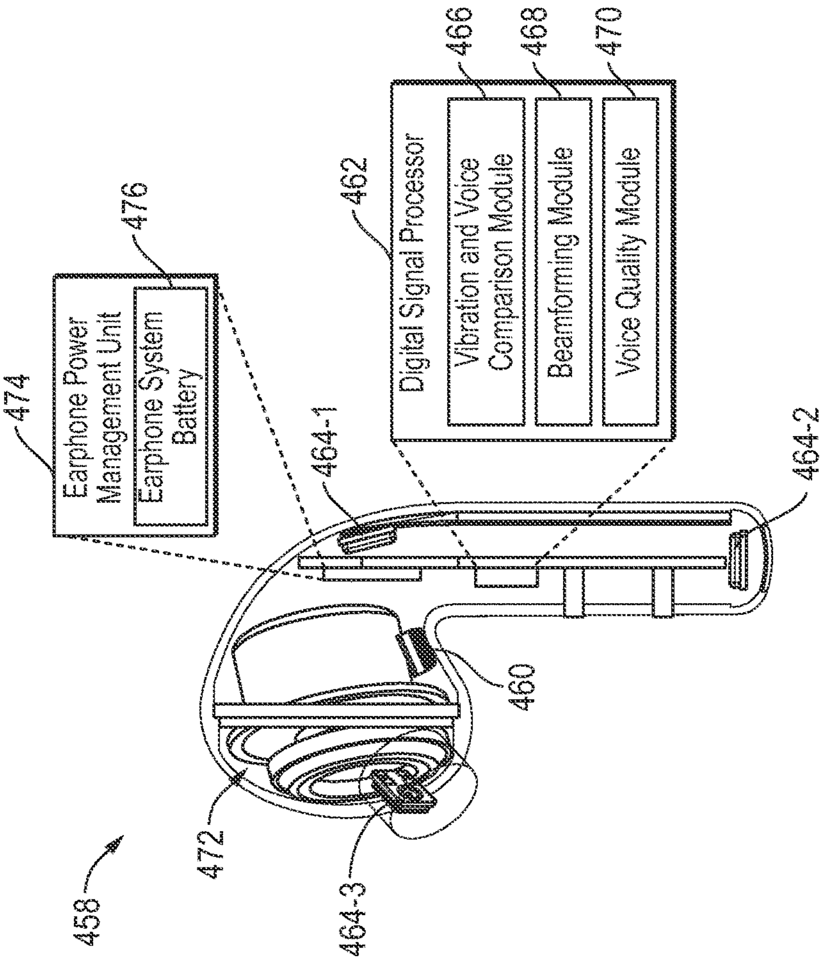
FIG. 4B is a graphical diagram of an earphone that includes a voice pick-up sensor and digital signal microprocessor executing computer-readable program code instructions of a beamforming module used to alter the angle at which the user's voice is detected via beamforming with the fixed microphones based on different orientations of the earphones relative to the user's mouth according to another embodiment of the present disclosure.

FIG. 4A is a diagram depicting a user 486 wearing earphones 458 such as an earbud with the voice detection zone 484 being aligned with the user's mouth regardless of the placement of the earphones 486 within the user's 486 ears including a correction of a misaligned voice detection zone 488 according to an embodiment of the present disclosure. It is appreciated that because the image of the user 486 is a profile, a second or additional earphone 458 has been placed in the user's 486 right ear as well. FIG. 4B is a graphical diagram of an earphone 458 such as an earbud that includes a voice pick-up sensor 460 and beamforming module 468 executable on a digital signal processor 462 used to alter the angle of the voice detection zone 484 if misaligned such as at 488 at which the user's voice is detected based on different orientations of the earphones 458 relative to the user's mouth according to another embodiment of the present disclosure. Again, it is appreciated that the earphone 458 shown in FIG. 4B, that may be an earbud, may be accompanied by another earphone such that each of a pair of the earphones 458 may each be placed in one of the user's cars during use.

In an embodiment, the earphone 458 shown in FIGS. 4A and 4B is one of a pair of earphones 458 or earbuds. Because each of these earphones 458 may include a plurality of microphones, these additional microphones may be used to detect, at least, the user's voice at a left side of the user's head and the right side of the user's head. These two left and right earphones 458 may coordinate, therefore, with each other to provide audio input to the DSP as described herein. Coordination may occur wirelessly through wireless pairing of each earphone, such as through a BT or BLE wireless protocol or via another WPAN wireless protocol in some embodiments. In other embodiments, the left and right earphones may be wired and may coordinate with one another via wired connection. In this way, the left and right earphones may form an array of left and right fixed, boomless microphones that may operate according to various embodiments herein to determine a voice detection zone and recalibrate the same when necessary.

In an embodiment, the earphones 458 may be fit into the user's 486 ear and the user 486 may be allowed to orient the earphones 458 in the user's 486 ear to achieve a comfortable position. However, this alteration of the orientation of the earphones 458 by the user 486 forms an unaligned voice detection zone 488 away from the user's 486 mouth where the user's voice is to be detected. The earphones 458 may include any type of audio input/output device that detects the user's voice at one or more microphones 464-1, 464-2, 464-3 and provides audio output to the user via one or more speakers 472. In an embodiment, a first microphone 464-1 may include a feedforward microphone 464-1 that is formed on an outside surface of the earphones 458 and is used to capture noises and the user's voice. In an embodiment, this feedforward microphone 464-1 may be used in an active noise cancellation process that cancels out ambient noise after the DSP 462 has executed the beamforming module 468 to realign the voice detection zone 484 at the user's mouth. In an embodiment, this feedforward microphone 464-1 may be positioned at an upper and rearward position within the housing of the earphones 458.

In an embodiment, the earphones 458 may also include additional microphones 464-2, 464-3. In an example embodiment, a secondary microphone 464-2 may be formed at a position on the earphones 458 away from the feedforward microphone 464-1 such that the user's voice as well as other noises may be picked up concurrently with the feedforward microphone 464-1. In an embodiment, the feedforward microphone 464-1 and secondary microphone 464-2 may form part of an array of microphones 464-1, 464-2 on each of the individual earphones 458 (e.g., a feedforward microphone and secondary microphone on each of the earphones 458) that each detect, independently, the user's voice as well as other surrounding sounds. In an embodiment, both the feedforward microphones 464-1 and secondary microphones 464-2 may be formed into a housing of the each of the earphones 458 at specific locations thereby forming an array of microphones 464-1, 464-2 such that the user's voice and surrounding sounds can be detected.

As described herein, the earphones 458 include a voice pick-up sensor 460 that detects vibrations created by the user's voice when the user 486 is talking. For purposes of the present specification, the voice pick-up sensor 160 may be any type of device that detects vibrations at the headphones 158 as described herein. The voice pick-up sensor 460 may capture the user's voice pattern by detecting vibrations of the bones or other tissues in the user's face or head. As the user talks, the vibration of the user's vocal cords may create this vibration throughout various bones in the user's head including the jawbone and the skull or via the user ears or other tissues. In an embodiment, the voice pick-up sensor 460 may include a piezoelectric layer that receives the vibrations at the user's face or head when the user 486 is talking. Movement of the piezoelectric layer creates an electrical signal that is detectable by the voice pick-up sensor 460 and passed onto the DSP 462 as described herein. In an example embodiment, the voice pick-up sensor 460 may be a Voice Pick Up Bone Sensor (VPU) by Sonion®, a VA1200 Bone Conductor Sensor by Vesper®, and the like that includes any voice pick-up sensor as described herein. In the embodiment shown in FIG. 4B, the voice pick-up sensor 460 is placed on an interior surface of the housing of the earphones 458 such that vibrations from the user's 486 bones and cartilage at a base of the user's 486 ear and head are transmitted through the housing of the earphones 458 and received at the voice pick-up sensor 460. It is appreciated that the earphones 458 may include a plurality of voice pick-up sensors 460 that detect the vibrations at different locations within the earphones 458 and are used to confirm that the user 486 is or is not actively talking.

During operation, the earphones 458 may be initiated by the user by, for example, activating a switch, via motion sensor, via a touch sensor, or inserting the USB plug into a USB port of the information handling system or other switch or sensor. In an embodiment, the earphones 458 may be initiated when, for example, the earphones 458 are removed from a charging case which triggers the initiation of the BT or BLE wireless connection with the information handling system. This initiation of the earphones 458 causes the earphone PMU 474 to provide power from the earphone system battery 476 to the DSP 462. Additionally, the earphone system battery 476 may provide power to the voice pick-up sensor 460 described herein such that the voice pick-up sensor 460 may continuously detect vibrations at the user's 486 car when the user is talking. This is done by detecting the vibrations from the user's jaw and/or skull as translated through the cartilage or other tissue of a user's ear or head in an embodiment.

In an embodiment, the DSP 462 may receive audio input as detected by each of the microphones 464-1, 464-2, within the microphone array. This audio input may be used to determine whether the user's voice is detected by the microphones 464-1, 464-2. In an example embodiment, the audio input from the microphones 464-1, 464-2 may be processed by the DSP 462 executing computer-readable program code of an automatic speech recognition algorithm to determine if the audio comprises human speech and, thus, potentially the voice of the user. In an embodiment, the detection of voices within the audio input may include either the user's 486 voice and/or other human speech around the user.

If a voice is detected, the DSP 462 may compare the vibration input from the voice pick-up sensor 460 indicating a user is talking with the occurrence of detected voice audio input from the microphones 464-1, 464-2 if any, or at wat level in an embodiment. In an embodiment, the DSP 462 may execute computer-readable program code of a vibration and voice comparison module 466 to compare when occurrences of vibration from talking to detected voice audio input detected at the microphones 464-1, 464-2 and other microphones on a second earphone. In another embodiment, the DSP 462 may execute computer-readable program code of a vibration and voice comparison module 466 to compare the magnitude of the vibrations detected by the voice pick-up sensor 460 with an amplitude or voice level of the voice input or audio input picked up at the array of microphones 464-1, 464-2 or others to determine whether it is the user's voice that is speaking and set expected amplitude levels for the user's speech to set and use with expected amplitude threshold levels of voice audio input.

Where no match is found such as when the detected occurrence of vibrations at the voice pick-up sensor 460 do not match the occurrence of the detected voice/speech at the microphones 464-1, 464-2, the process may continue with the DSP 462 detecting voice activity at the voice pick-up sensor 460 and engage in re-calibration beamforming as described herein to adjust the voice detection zone 484 in search of the user's voice in an embodiment. In another embodiment, where no match is found such as when the detected magnitude of vibrations at the voice pick-up sensor 460 do not match the amplitude of the detected voice/speech at the microphones 464-1, 464-2 expected to meet a threshold level, the process may continue with the DSP 462 detecting voice activity at the voice pick-up sensor 460 and engage in re-calibration beamforming as described herein to adjust the voice detection zone 484 to more accurately cover the location of the user's voice to a sufficient amplitude or SNR meeting a threshold level that produces a voice audio input that is usable and discernable above background noise for communications or one or more applications executing on an information handling system. As described herein, the execution of the computer-readable program code of the beamforming module 468 causes the DSP 462 to shift the beamforming angle of a voice detection zone 484 via microphone gain levels on one or more microphones 464-1, 464-2 as well as filtering and other microphone directionality adjustments, increase, or shift the area covered within the voice detection zone 484, and/or turn the beamforming process off in order to detect audio signals from all directions to obtain the user's voice audio input when it is absent but the voice pick-up sensor 460 detects the user speaking. In an embodiment, where shifting the beamforming angle of the voice detection zone 464 does not cause the DSP 462 to be able to detect the user's voice, the beamforming process may then move to increasing or opening up the area covered within the voice detection zone 484. In an embodiment, where increasing the area within the voice detection zone 484 does not cause the DSP 462 to be able to detect the user's voice via matching of the occurrence or the magnitude of the detected vibrations at the voice pick-up sensor 460 with an amplitude of the user's voice at a threshold level picked up at the array of microphones 464-1, 464-2, the beamforming process may then move to turning the beamforming process off in order to detect all audio signal from all directions. In this step-wise process, the user's 486 voice may be detected while, as much as possible, other sounds outside of the voice detection zone 484 may be filtered out by the DSP 462.

Where a match is found between the occurrence or the magnitude of the vibrations detected at the voice pick-up sensor 460 and an amplitude or SNR threshold level of a detected voice (e.g., the user's voice) picked up at the array of microphones 464-1, 464-2, the DSP 462 may execute computer-readable program code of a voice quality module 470 to determine whether the detected user's 486 voice has a sufficient frequency, sufficient amplitude, or sufficient SNR level for audio input to be acceptable or usable for a given software application or communications. In an embodiment, the DSP 462 may determine whether a threshold amplitude, threshold frequency, or threshold SNR level has been reached to determine whether the sufficient frequency, sufficient amplitude, or sufficient SNR level for audio input at the array of microphones 464-1, 464-2 has been met relative to background noise or voice audio signal level.

As described herein, the user may wear the earphones 458 in a position that is most comfortable to the user. This optimal comfort position of the earphones 458 may result in the earphones 458 being placed such that the voice detection zone 484 detectable with the microphones 464-1, 464-2 is not aligned with the user's mouth thereby creating an unaligned voice detection zone 488. Thus, the DSP 462 may execute computer-readable program code of the beamforming module 468 to recalibrate the voice detection zone 484 such that the voice detection zone 484 is moved down, in the embodiment shown in FIG. 4A, from the misaligned zone 488 location via gain, frequency, filtering, and other microphone beamforming techniques as indicated by arrow C in FIG. 4A. As described herein, the execution of the computer readable-program code of the beamforming module 468 may include shifting a beamforming angle of a voice detection zone left, right, up or down, widening the voice detection zone by increasing one or more of the beamforming angles of the voice detection zone, and/or stopping beamforming and receiving audio signals from all directions away from the headphone. Thus, in an embodiment, the execution of the computer readable-program code of the beamforming module 468 may include increasing the beamforming angle of the voice detection zone 488 as indicated by angle D shown in FIG. 4A. During the beamforming process, however, the increased angle D may be again reduced when the DSP 462 detects a correlation between the vibrations detected by the voice-pick up sensor 460 matches the user's voice received at the one or more microphones 464-1, 464-2, 464-3 and the beamforming module may again iteratively focus the voice detection zone to the user's mouth location as described herein.

The microphone beamforming for adjusting the voice detection zone 484 is conducted by execution of the computer-readable program code instructions of the beamforming module 468 until the user's voice is detected at a minimum amplitude threshold level and SNR level when the vibration and voice comparison module 466 detects a match between the occurrence or magnitude of the vibrations detected by the voice pick-up sensor 460 with the occurrence or amplitude of a voice audio input detected at the microphones 464-1, 464-2. The magnitude of vibration from voice pick-up sensor 460 may adjusted voice audio input threshold amplitude level or threshold SNR level proportionally in an embodiment. Larger magnitude of vibration should result in a higher amplitude of voice audio input received at the microphones 464-1, 464-2 and thus a higher minimum amplitude threshold level or minimum SNR threshold level for sufficient voice audio input of a user's voice. In an embodiment, the beamforming process may include any spatial audio filtering that filters out background noise outside of the voice detection zone 484 while concurrently allowing the DSP 462 to detect the user's voice as the voice detection zone 484 is moved. Execution of the computer-readable program code instructions of the vibration and voice comparison module 466 concurrently with the execution of the beamforming module 468 provides for the active adjustment of voice detection zone 484 while the user is detected and confirmed as speaking from detected vibrations. In this way, the DSP 462 may focus in on a user's voice audio input as speaking occurs and with a relative amplitude or SNR level to match the occurrence and/or magnitude of the vibrations detected by the voice pick-up sensor 460. In this way, iterative adjustments to the gain and filtering among the array of microphones (e.g., 464-1, 464-2 and other microphones) may be conducted only while confirmed utterances are occurring from the user 486 which may expedite the beamforming process and provide real time feedback of matching and reaching voice input data amplitude or SNR threshold levels in embodiments herein.

In an embodiment, the earphones 458 may also include additional microphones 464-3 such as a feedback microphone 464-3 that is located within a portion of the earphones 458 that fits into the user's 486 ear canal for example. This feedback microphone 464-3 may pick up sound waves and generate a correction signal that cancels out unwanted noise detected within the user's 486 ear canal. This feedback microphone 464-3 may, therefore, be used by the DSP 462 to execute computer-readable program code of an active noise cancelling algorithm in order to actively cancel out those noises detected by the feedback microphone 464-3 in the user's 486 ear canal.

In an embodiment, the execution of the beamforming module 468 by the DSP 462 may cause the DSP to interface with an information handling system (e.g., 100, FIG. 1) to present an on-screen display that informs the user to adjust the earphones 458 in a specific direction to facilitate the change in the direction of the voice detection zone 488. For example, where a user is implementing a smartphone to provide, wirelessly, audio output to the earphones 458, the DSP may exchange data with the smartphone for the smartphone to present an on-screen display that may include text and/or diagrams that prompt a user to readjust the earphones 458 within the user's ear. This interface may include an alerting notification to the user via an audible or vibrational output at the smartphone to gain the user's attention to the prompt the user to complete the adjustments to the orientation of the earphones 458 within the user's ears. Thus, in an embodiment, the execution of the computer readable-program code of the beamforming module 468 may include the DSP engaging in one or more beamforming processes as described herein, providing a prompt to the user via a display on an information handling system, or both methods in order to adjust the positioning of the voice detection zone 488 described herein.

Figure 5:
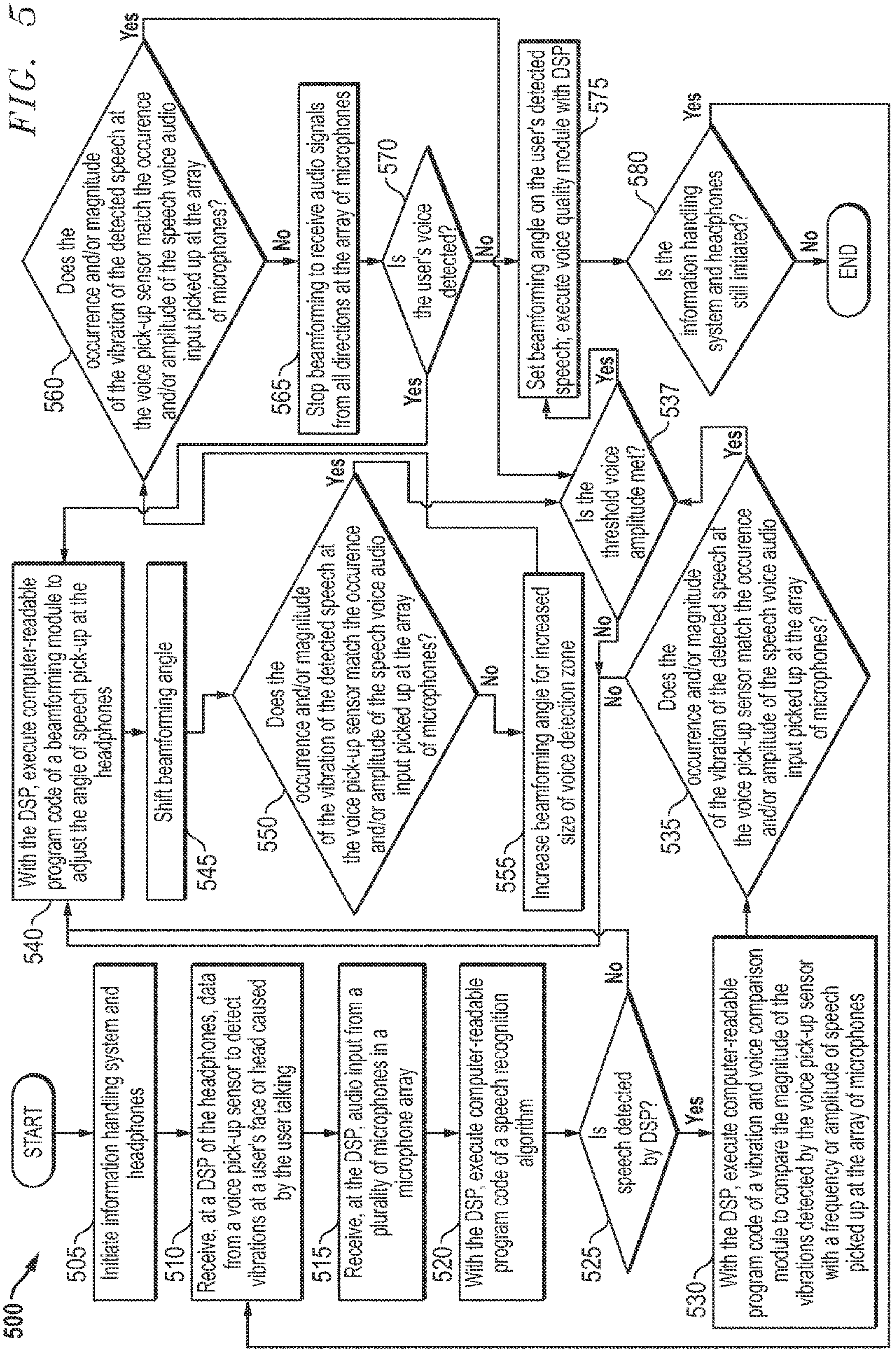
FIG. 5 is a flow chart showing a method of adjusting an angle of speech pick up via a voice detection zone from fixed microphones in a set of headphones or earphones via adaptive beamforming and a voice pick-up sensor according to another embodiment of the present disclosure.

FIG. 5 is a flow chart showing a method 500 of adjusting an angle of speech voice audio input pick up in a voice detection zone at microphones of a headphone device according to an embodiment of the present disclosure. As described herein, the headphones may include a headset type headphone as described in connection with FIGS. 2A through 3B or a set of earphones as described in connection with FIGS. 4A and 4B. As described herein, the headphones includes a DSP with a voice pick-up sensor and a plurality of microphones formed within the housing of the headphones operatively coupled to the DSP. Additionally, the headphones may include one or more speakers or other audio drivers that allows for audio output to be heard by the user.

The method 500 may include, at block 505, initiating the information handling system and the headphones. In an embodiment, the information handling system may be initiated via the user actuating a power button that causes a booting sequence to be initiated in order to execute a BIOS and OS at the hardware processor of the information handling system. In an embodiment, the initiation of the headphones may include, for example, actuating a switch, actuating a motion sensor or touch sensor, removing the headphones from a case, or other initiation trigger such as a user plugging in a universal serial bus (USB) connection to a USB port at the information handling system where the headphones are to be operatively coupled to the information handling system via a wired connection. Where the headphones are to be operatively coupled to the information handling system vie a wireless connection, the DSP of the headphone may initiate a BT or BLE wireless connection as described herein.

At block 510, data may be received at the DSP of the headphones from the voice pick-up sensor. In an embodiment, the voice pick-up sensor may capture the user's voice pattern by detecting vibrations of the bones or other tissues in the user's face or head. As the user talks, the vibration of the user's vocal cords may create this vibration throughout various bones in the user's head including the jawbone and the skull and through cartilage of the user's cars in some embodiments. In an embodiment, the voice pick-up sensor may detect occurrence, as well as a magnitude and frequency, of the vibrations and relay this data to the DSP. In an embodiment, the voice pick-up sensor may include a piezoelectric layer of the voice pick-up sensor in any part of the headphones that receives the vibrations from the user's face or head when the user is talking. Movement of the piezoelectric layer of the voice pick-up sensor, via conduction at the housing of the headphones touching a user's head, creates an electrical signal that is detectable and passed onto the DSP as described herein. The voice pick-up sensor may determine occurrences of the user speaking as vibrations to confirm if user voice audio input is being received by the microphones in the voice detection zone or to provide for times when beamforming recalibration should occur while the user is speaking in some embodiments. In other embodiments, the voice pick-up sensor may determine magnitude of vibration during occurrences of the user speaking to determine what user voice audio input amplitude should be received by the microphones in the voice detection zone and set amplitude or SNR voice input threshold levels to determine if beamforming recalibration should occur or whether the user voice audio input data received is of sufficient level relative to the user's speaking level to meet the requirements of communications or software applications executing on an information handling system operatively coupled to the headphones. Greater detected vibration magnitude should result in greater expected voice audio input levels and thresholds in an embodiment.

At block 515, voice audio input detected by the microphones may be provided to the DSP. As described herein, any number of microphones located on each earcup side or earphone side may be used to pick up audio that includes the user's voice, other human voices, and surrounding noises at or near the headphones. In an embodiment where the headphones are a headset such as that shown and described in connection with FIGS. 2A, 2B, 3A, and 3C, a plurality of microphones may be formed into the housing of the first earpiece and second earpiece with each microphone being operatively coupled to the DSP. In an embodiment where the headphones are earphones such as a pair of earbuds, a plurality of microphones may be formed into each left and right earbud earpiece that may include a feed forward microphone and a secondary microphone that are each coupled to the DSP formed into one or both of the earpieces.

At block 520, the DSP may execute computer-readable program code of a speech recognition algorithm. Execution of the computer-readable program code of the speech recognition algorithm may allow the DSP to determine if the audio input comprises human speech and, thus, potentially the voice of the user as voice audio input. In an embodiment, the detection of voices within the audio input from the microphones may include either the user's voice and/or other human speech and noises around the user and the headphones. Although speech is heard, it is appreciated that the speech detected may not be the user's speech and may be part of the background noise that is to be filtered out in lieu of the user's voice during operation of the headphones. Thus, the voice pick-up sensor may detect vibrations to confirm if the user is speaking. Further, human voices may include the user's voice but may be of insufficient amplitude level or SNR level to be usable without further filtering or beamforming directionality adjustment of the microphones to reach a threshold amplitude or SNR level of voice audio input sufficiency for communications or software applications executing on an information handling system operatively coupled to the headphones. Thus, at block 525, the DSP of the headphone may determine whether any speech is detected regardless of whether it is the user's voice or not.

Where, at block 525, the DSP has determined that speech has been detected in the voice audio input provided by the array of microphones formed within the housing of the headphone, the method 500 includes, at block 530, executing computer-readable program code of a vibration and voice comparison module at the DSP to compare the occurrence and/or magnitude of the vibrations detected by the voice pick-up sensor with a an occurrence and/or an amplitude or SNR level of speech in the voice audio input picked up at the array of fixed microphones in the headphones. In an embodiment, only the occurrence of the vibrations may be compared to the occurrence and/or amplitude of the speech in the voice audio input picked up by the array of the microphones. It is appreciated that, in another embodiment, only the magnitude of vibrations may be compared to the magnitude of speech in the voice audio input picked up by the array of microphones such as to set an expected level and threshold level of amplitude or SNR level of a user's voice in the voice audio input. In an embodiment, both the occurrence and magnitude of the vibrations may be compared to the occurrence and amplitude of the speech picked up by the array of microphones.

At block 535, the DSP may determine if either or both of the occurrence or magnitude of the vibration of the detected speech at the voice pick-up sensor matches either or both the occurrence and/or amplitude of the speech voice audio input picked up at the array of microphones. In an embodiment, a matching of either or both occurrence and/or magnitude of the vibrations and occurrence and/or amplitude of the speech voice audio input may indicate that the user's speech is currently being detected while the opposite is also true. In an embodiment, a mismatch of either or both the occurrence and/or magnitude of the vibrations and the occurrence and/or amplitude of the speech voice audio input may indicate that the microphones are currently picking up a voice of another person that was to be filtered out by the operation of the DSP executing, for example, directionality for a voice detection zone generated by the beamforming module or another noise cancelling module and/or algorithm. This may indicate a misalignment of the beamforming for the voice detection zone from the array of microphones.

Where, at block 535, the DSP determines that the either or both of the occurrence and/or magnitude of the detected speech at the voice pick-up sensor matches either or both the occurrence and/or amplitude of the speech voice audio input picked up at the array of microphones, the method 500 continues to block 537 with the DSP determining whether a threshold amplitude or SNR level of the voice audio input has been reached. The threshold amplitude or SNR level of the voice audio input may be adjusted up or down based on the magnitude of the vibrations detected from the voice pick-up sensor according to embodiments herein to adjust for the speech volume of the user when speaking. Where the threshold amplitude and/or threshold SNR level of the voice audio input has been reached at 537, the method 500 may continue to 575 with the DSP setting the beamforming angle at the angle at which the speech voice audio input has been detected by the DSP that has met these thresholds and been confirmed as the user's speech from occurrence of vibrations of the voice pick-up sensor. In this embodiment, the initially-selected beamforming angle for the voice detection zone upon initiation at 505 may have been that beamforming angle at which the user's voice was previously detected or may be one set at a manufacturer for typical wearing orientation of the headphones. When the beamforming angle is set by the DSP at block 575 such that the voice audio input is of a sufficient amplitude or SNR threshold level to be usable for software applications or communication, the method 500 proceeds to block 580. At block 580, the method 500 includes determining if the information handling system and headphone is still initiated. Where the information handling system and headphone are not initiated, the method 500 may end here. Where the information handling system and headphone are still initiated, the method 500 may continue to block 510 to continue to monitor the data from the voice pick-up sensor and microphones as described herein.

Returning to block 535, where either or both of the occurrence and magnitude of the detected speech at the voice pick-up sensor does not match either or both the occurrence and/or amplitude of the speech voice audio input picked up at the array of microphones or at block 537, the threshold amplitude and threshold SNR level of the voice audio input has not been reached, the DSP may engage in a recalibration process to change the beamforming angle to adjust to a new voice detection zone at the headphones. In an embodiment, the method 500 proceeds to block 540 with executing computer-readable program code of a beamforming module, via the DSP, to adjust the angle of speech voice audio input pick-up of the voice detection zone by the microphones of the headphones. As described herein, the beamforming process may include any spatial audio filtering and gain control among the array of microphones to adjust the focused location of the voice detection zone that filters out background noise outside of the voice detection zone at a given beamforming angle from the array of microphones in an embodiment. Iterative adjustments to the spatial audio filtering and gain control among the array of microphones to adjust the focused location of the voice detection zone is conducted while the DSP concurrently detecting the user's voice with vibration of the voice pick-up sensor so that feedback detecting voice audio input amplitude or SNR levels may be continuously assessed relative to the set amplitude and SNR threshold levels as the voice detection zone is moved. In an embodiment, this adjustment of the angle of speech voice audio input pick-up and the beamforming angle may include the DSP moving the beamforming angle up or down in a forward-facing direction or left or right headphone relative to the earcups or earbuds as indicated, for example, in FIGS. 3A and 3B. Thus, at block 545, the beamforming angle of the voice detection zone may be shifted in an attempt to change the voice detection zone location to be in front of the user's face and closer to the user's mouth. This is done to detect, with the array of microphones, the user's voice whose amplitude and SNR level, and/or frequency, matches the occurrence and/or magnitude of the vibrations detected at the voice pick-up sensor and meets a sufficient amplitude or SNR threshold level.

At block 550, the DSP may again determine if either or both of the occurrence and/or magnitude of the detected speech at the voice pick-up sensor matches either or both the occurrence and/or amplitude of the speech voice audio input picked up at the array of microphones. Where, at block 550, the DSP determines that the either or both of the occurrence and/or magnitude of the vibration of the detected speech at the voice pick-up sensor matches either or both the occurrence and/or amplitude of the speech voice audio input picked up at the array of microphones, the method 500 continues to block 537 with the DSP determining whether a threshold amplitude or SNR level of the voice audio input has been reached. Again, where threshold amplitude or SNR level has been reached at 537, the method 500 continues to block 575 with the DSP setting the currently adjusted beamforming angle of the voice detection zone at which the speech has been detected by the DSP and which meets the threshold amplitude, or threshold SNR level as described herein as the current operational beamforming angle for the voice detection zone in the current orientation that the user is wearing the headphones.

However, where, at block 550, either or both of the occurrence and/or magnitude of the vibration of the detected speech at the voice pick-up sensor does not match either or both the occurrence and/or amplitude of the speech voice audio input picked up at the array of microphones, the DSP may iteratively engage in further recalibration procedures as described and conduct those simultaneously with the detected vibration of the user's speech by the voice pick-up sensor. In an embodiment, these further recalibration procedures includes, at block 555, increasing the beamforming angle to widen the aspect or size of the voice detection zone at which the microphones can detect speech. The increasing of the beamforming angle defining the voice detection zone also increases the voice detection zone that human speech can be detected. Although this process at block 555 may increase the opportunities of external noises and voices being detected by the microphones, it may also increase the opportunity to detect the user's speech as voice audio input. Indeed, the execution of the computer-readable program code instructions of the vibration and voice comparison module by the DSP may determine if a matching voice is detected within the increased beamforming angle. Then, execution of the beamforming module, as in block 545, may again adjust the size and angle of the voice detection zone iteratively as discussed in embodiments herein to focus in on that detected speech by again narrowing the beamforming angle on that voice detection zone where the user's voice is being detected by the array of microphones in an embodiment. However, if the size of the voice detection zone is increased at block 555 and not readjusted as described, the flow proceeds to block 560.

At block 560, the DSP may once again determine if either or both of the occurrence and/or magnitude of the detected speech at the voice pick-up sensor matches either or both the occurrence and/or amplitude of the speech voice audio input picked up at the array of microphones. Where, at block 560, the DSP determines that the either or both of the occurrence and/or magnitude of the detected speech at the voice pick-up sensor matches either or both the occurrence and/or amplitude of the speech voice audio input picked up at the array of microphones within the increased beamforming angle for a larger voice detection zone, the method 500 continues to block 537 as described herein. Where at block 537 the DSP determines that a threshold amplitude or SNR level of the voice audio input has been reached, the method 500 continues to block 575 with the DSP setting the currently adjusted beamforming angle and voice detection zone size at that angle as the current operation voice detection zone at which the speech has been detected by the DSP as described herein. From here, the flow will proceed to block 580 as before to determine if the information handling system or the headphones are still initiated.

However, at block 560, where the either or both of the occurrence and/or magnitude of the detected speech voice audio input at the voice pick-up sensor does not match either or both the occurrence and/or amplitude of the speech voice audio input picked up at the array of microphones when the voice detection zone has been expanded at least once of plural times at blocks 555 and 560, the DSP may further recalibrate the beamforming by, at block 565, stopping all beamforming and start to detect, at all angles from the headphones, audio signals at the array of microphones. Again, although this may cause the array of microphones to capture noises at and around the headphone, the DSP may continue to compare the occurrence and/or amplitude of any detected speech with the occurrence and/or magnitude of vibrations detected by the voice pick-up sensor. Again, because the detected vibrations originate from the user only, this data is used to compare to any occurrence and/or amplitude of speech voice audio input detected from any angle from the headphone. At 570, therefore, the DSP may determine if the user's voice is detected. In some cases, the user may not be currently speaking and, therefore, no vibrations may be detected by the voice pick-up sensor while speech voice audio input is being detected from other sources apart from the user himself or herself. Where the user's voice is detected, the method 500 may return to block 540 to complete the processes described herein. Where, at block 570, the user's speech is not detected, the method 500 may continue to block 575 with the DSP setting the beamforming angle to detect any angle at the headphones to continue monitoring for the user's speech as described herein. Again, the optimal comfort positioning of the headphones by the user may result in the headphone being placed such that the voice detection zone is not aligned with the user's mouth. The execution of the beamforming module and vibration and voice comparison module by the DSP and the recalibration processes described in embodiments herein allows for the DSP to reform the beamforming angle while detecting voice vibrations as well for user speech confirmation and matching, if necessary, in order to optimize the angle at which the user's voice is detected.

In an embodiment, at block 575, the DSP may execute computer-readable program code of the voice quality module to further optimize the quality of the user's voice detected at whatever set operation beamforming angle or sizing of the voice detection zone is selected at block 575. In an embodiment, the execution of the computer-readable program code of a voice quality module may cause the DSP to determine whether the detected user's voice has a sufficient amplitude, SNR levels, or frequency for voice audio input that is set for use with various software application for communications. This reassessment of quality may be particularly relevant in situations where the voice detection zone has been widened or beamforming has been ceased such that sounds from all angles are recorded by the microphone array. In an embodiment, the DSP may determine whether a threshold amplitude or threshold SNR level has been reached to determine whether the sufficient amplitude and sufficient SNR level for voice audio input at the array of microphones meets the needs for communication or various software applications. This amplitude and SNR threshold level may vary or be adjusted depending on the magnitude of vibrations detected by the voice pick-up sensor in some embodiments as described herein. Further the amplitude and SNR threshold level may be different depending on the communication type or software application being executed in some embodiments. Also at block 575, the digital signal processing may include the application of appropriate gain, anti-echo, and noise cancellation algorithms to the digital voice audio input signal in order to increase the quality of the detected user's speech. After altering the quality of the audio, the method 500 may continue to block 580 as described herein.

The blocks of the flow diagram of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A set of headphones comprising:

a digital signal processor (DSP);

a headphone power management unit (PMU) to provide power to the DSP;

a voice pick-up sensor to detect vibrations at a user's head caused by the user talking;

an array of fixed, boomless microphones on the set of headphones; and the DSP to utilized microphone beamforming establish a voice detection zone that is directional to record the user's voice as audio voice input data that is picked up via the array of microphones formed into the headphones and to reduce recording of background sounds;

the DSP executing computer-readable program code instructions of a vibration and voice comparison module to determine whether the user's voice is detected at the array of microphones when the voice pick-up sensor detect vibrations of the user talking; and the DSP executing computer-readable program code of a beamforming module to recalibrate an angle of the voice detection zone at which the array of microphones detects the user's voice when the DSP does not detect the user's voice at the array of microphones when the voice pick-up sensor detects vibrations of the user talking.

2. The set of headphones of claim 1 further comprising:

the voice pick-up sensor includes a piezoelectric layer that receives the vibrations from the user's head and a housing of the set of headphones to detect when the user is talking.

3. The set of headphones of claim 1 further comprising: the DSP to execute computer-readable program code of the vibration and voice comparison module to compare the magnitude of the vibrations detected by the voice pick-up sensor with an amplitude of the user's voice picked up at the array of microphones to set a voice audio input amplitude threshold level.

4. The set of headphones of claim 1, wherein a match between an occurrence of the vibrations detected by the voice pick-up sensor and the occurrence of the user's voice as voice audio input picked up at the array of microphones indicates to the DSP that the user's voice is being picked up by the array of microphones.

5. The set of headphones of claim 4, wherein the match between the occurrence of the vibrations detected by the voice pick-up sensor and the occurrence of the user's voice picked up at the array of microphones sets the current voice detection zone as the operation voice detection zone for the orientation that the user is wearing the set of headphones.

6. The set of headphones of claim 1 further comprising:

the DSP to execute computer-readable program code of a voice quality module to determine whether the detected user's voice as voice audio input has a sufficient amplitude to meet a threshold amplitude for voice audio input from the array of microphones for use with communications or execution of software applications at an operatively coupled information handling system to the set of headphones and sets the current voice detection zone as the operation voice detection zone for the orientation that the user is wearing the set of headphones.

7. The set of headphones of claim 1 further comprising: the DSP executing the computer programmable code instructions of the beamforming module for recalibration includes shifting a beamforming angle of the voice detection zone, increasing the beamforming angle to increase the size of the voice detections zone, or stopping beamforming to receive audio input from available directions away from the array of microphones.

8. A method of adjusting an angle of a voice detection zone for speech pick up at a set of headphones comprising:

detecting vibrations, via a voice pick-up sensor integrated into the set of headphones, at a user's head when a user is talking;

determining, via a digital signal processor (DSP), when the user's voice is picked up via an array of microphones formed into the headphone;

with the DSP, determining where a user's voice is picked up as a voice audio input via an array of microphones formed into the set of headphones; and executing computer-readable program code instructions, via the DSP, of a vibration and voice comparison module to determine whether the user's voice is detected at the array of microphones when the voice pick-up sensor detects vibrations of the user talking; and executing computer-readable program code of a beamforming module, via the DSP, to recalibrate an angle of the voice detection zone at which the array of microphones detects the user's voice when the DSP does not detect the user's voice at the array of microphones when the voice pick-up sensor detects vibrations of the user talking.

9. The method of claim 8 further comprising:

the voice pick-up sensor is integrated into the headphone set and includes a piezoelectric layer that receives the vibrations at the user's head to detect when the user is talking.

10. The method of claim 8 wherein the set of headphones are a set of earbuds having the array of microphones in each earbud.

11. The method of claim 8 wherein the set of headphones is a headset with a pair of earcups having the array of microphones in each earcup.

12. The method of claim 8 further comprising:

the DSP executing computer-readable program code of the vibration and voice comparison module to compare a magnitude of the vibrations of the user talking detected by the voice pick-up sensor with an amplitude of the voice audio input picked up at the array of microphones to set a threshold amplitude level of the voice audio input.

13. The method of claim 8, further comprising:

the DSP executing computer-readable program code of the vibration and voice comparison module to compare a magnitude of the vibrations of the user talking detected by the voice pick-up sensor with an amplitude of the voice audio input picked up at the array of microphones to determine when a mismatch between the magnitude of the vibrations of the user talking detected by the voice pick-up sensor and the amplitude of the voice audio input from the user picked up at the array of microphones indicates to the DSP that external noises are being picked up by the array of microphones.

14. The method of claim 8 further comprising:

executing computer-readable program code of the vibration and voice comparison module to, via the DSP, determine that the voice pick-up sensor detects vibrations of the user talking when the voice audio input from the user is also recorded at the array of microphones; and executing computer-readable program code of a voice quality module, via the DSP, to determine whether the detected voice audio input of the user meets a threshold amplitude for the voice audio input from the array of microphones and to set a current angle of the voice detection zone at which the array of microphones detects the voice audio input of the user as an operation beamforming angle for the voice detection zone.

15. A set of headphones operatively coupled to an information handling system, comprising:

a digital signal processor (DSP);

a headphone power management unit (PMU) to provide power to the digital signal microprocessor:

a voice pick-up sensor to detect vibrations at a user's head caused by the user talking; and the DSP to determine where voice audio input of a user's voice is picked up via an array of microphones formed into the set of headphones;

the DSP to determine a mismatch when the voice audio input of the user's voice at the array of microphones is not detected while the vibrations at a user's head caused by the user talking are detected; and the DSP executing computer-readable program code of a beamforming module to recalibrate an angle of a voice detection zone at which the array of microphones detect the user's voice by shifting a beamforming angle relative to the user's head to iterative determine if the voice audio input of the user's voice at the array of microphones is detected while the vibrations at a user's head caused by the user talking are detected by the voice pick-up sensor.

16. The set of headphones of claim 15 further comprising:

the voice pick-up sensor includes a piezoelectric layer that receives the vibrations from the user's head via the set of headphones to detect when the user is talking.

17. The set of headphones of claim 15, further comprising:

the DSP to execute computer-readable program code of a vibration and voice comparison module, upon detecting the voice audio input of the user's voice at the array of microphones is detected while the vibrations at a user's head caused by the user talking are detected by the voice pick-up sensor, to compare the magnitude of the vibrations detected by the voice pick-up sensor with an amplitude of the vibrations from the user's voice picked up at the array of microphones to determine a voice audio input amplitude threshold level for the user talking.

18. The set of headphones of claim 15 further comprising:

the DSP to execute computer-readable program code of a voice quality module to determine whether the detected voice audio input received at the array of microphones has a sufficient amplitude to meet a threshold amplitude for sufficient operation for communications via the set of headphones.

19. The set of headphones of claim 18 further comprising:

the DSP executing computer-readable program code of the vibration and voice comparison module to determine that the voice pick-up sensor detects vibrations of the user talking when the voice audio input from the user is also recorded at the array of microphones; and the DSP to set a current angle of the voice detection zone at which the array of microphones detects the voice audio input of the user as an operation beamforming angle for the voice detection zone.

20. The set of headphones of claim 15, wherein the set of headphones is a headset with a pair of earcups.

* * * * *